(12) United States Patent
Jamshidi et al.

(10) Patent No.: US 9,369,336 B1
(45) Date of Patent: Jun. 14, 2016

(54) MANAGING COMMUNICATION LINKS

(71) Applicant: Sprint Communications Company L.P., Overland Park, KS (US)

(72) Inventors: Talat Jamshidi, Leawood, KS (US); Rajat Kumar, Kansas City, MO (US); Suryanarayanan Ramamurthy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 175 days.

(21) Appl. No.: 14/013,442

(22) Filed: Aug. 29, 2013

(51) Int. Cl.
*H04L 12/24* (2006.01)

(52) U.S. Cl.
CPC ........ *H04L 41/0659* (2013.01); *H04L 41/0654* (2013.01)

(58) Field of Classification Search
None
See application file for complete search history.

(56) References Cited

U.S. PATENT DOCUMENTS

| | | | | |
|---|---|---|---|---|
| 2007/0258360 A1* | 11/2007 | Senga et al. | | 370/218 |
| 2010/0304736 A1* | 12/2010 | Konda et al. | | 455/424 |
| 2012/0134259 A1* | 5/2012 | Bonnier et al. | | 370/221 |
| 2012/0239966 A1* | 9/2012 | Kompella | | H04W 24/04 714/4.11 |
| 2012/0300620 A1* | 11/2012 | Kothari et al. | | 370/225 |
| 2013/0003534 A1* | 1/2013 | Henry et al. | | 370/228 |
| 2013/0346788 A1* | 12/2013 | Haddad et al. | | 714/4.2 |

* cited by examiner

*Primary Examiner* — Robert M Morlan

(57) ABSTRACT

Systems, methods, and computer-readable media for managing communication links are provided. A bridging interface that is automatically created between two or more packet gateways during a failed communications link is described. The bridging interface may be utilized during the communications link such that a user experience is not negatively impacted. Temporary ownership of internet protocol addresses may be transferred among packet gateways such that sessions are not terminated during the transfer.

14 Claims, 4 Drawing Sheets

MANAGING COMMUNICATION LINKS

BRIEF SUMMARY

A high-level overview of various aspects of the invention is provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, managing communication links. In particular, communication links in telecommunications networks may be bridged when communications links fail. Communication links may fail for various reasons. For example, routing issues, interface issues, and the like may cause a failed communication link. When this happens, a user experience is negatively affected as a user is not able to regain full service until the communication link is restored.

BRIEF DESCRIPTION OF THE DRAWINGS

Illustrative embodiments of the present invention are described in detail below with reference to the attached drawing figures, and wherein.

DETAILED DESCRIPTION

Figure 1:
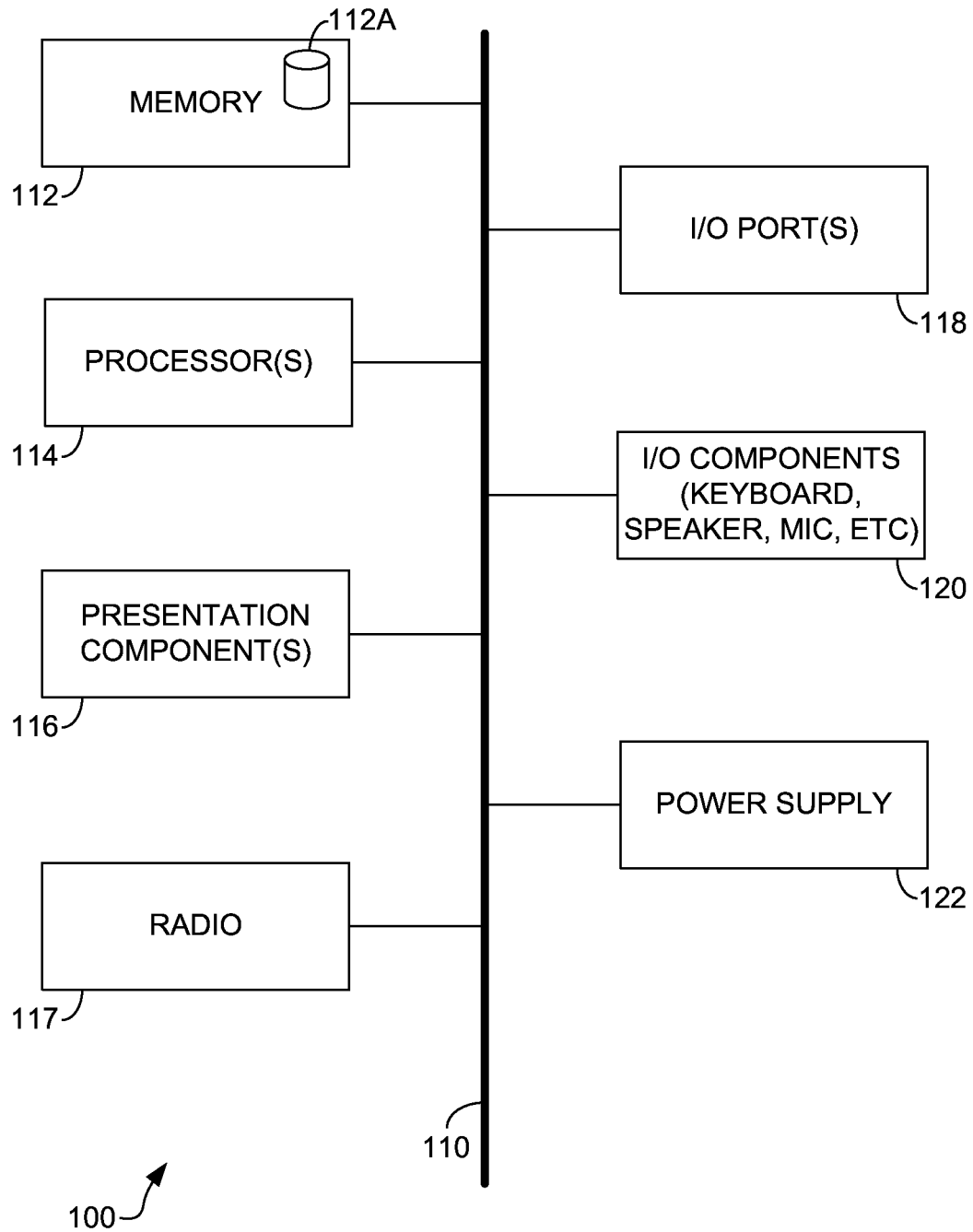
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention may be embodied as, among other things, a method, a system, or set of instructions embodied on one or more computer-readable media. As mentioned, embodiments of the present invention are directed toward managing communication links. In particular, communication links in telecommunications networks may be bridged when communications links fail. Communication links may fail for various reasons. For example, routing issues, interface issues, and the like may cause a failed communication link. When this happens, a user experience is negatively affected as a user is not able to regain full service until the communication link is restored.

Accordingly, in one aspect, the present invention is directed to a method for managing communication links. The method includes identifying a failed communications link between a first gateway and a data source, identifying one or more gateways associated with both the first gateway and the data source, and bridging the first gateway and the data source via a second gateway of the one or more gateways associated with both the first gateway and the data source such that data to be communicated from the first gateway to the data source is communicated to the data source by the second gateway.

In yet another aspect, a system for managing communication links is provided. The system includes a computing device associated with one or more processors and one or more computer storage media and a gateway manager for managing communication links. The gateway manager comprises an identifying component for identifying a connectivity status between one or more gateways and a data source and a bridging component for bridging communications between a first gateway to the data source via at least one gateway associated with both the first gateway and the data source, wherein the data source is the Internet.

In another aspect, embodiments of the present invention are directed to one or more computer-readable storage media having computer-executable instructions embodied thereon that, when executed, perform a method for managing communication links. The method includes identifying a failed communications link between a first gateway and a data source, identifying one or more gateways associated with both the first gateway and the data source, and bridging the first gateway and the data source via a second gateway of the one or more gateways associated with both the first gateway and the data source such that data to be communicated from the first gateway to the data source is communicated to the data source by the second gateway.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third Generation Mobile Telecommunications
4G Fourth Generation Mobile Telecommunications
CD-ROM Compact Disk Read Only Memory
CDMA Code Division Multiple Access
GPRS General Packet Radio Service
GSM Global System for Mobile communications: originally from Groupe Spécial Mobile
DVD Digital Versatile Discs
EEPROM Electrically Erasable Programmable Read Only Memory
HSGW High Speed Gateway
HLR Home Location Register
HSDPA High-Speed Downlink Packet Access
LTE Long Term Evolution
PGW Packet Gateway
PC Personal Computer
PDA Personal Digital Assistant
RAM Random Access Memory
ROM Read Only Memory
SGW Serving Gateway
TDMA Time Division Multiple Access
UMTS Universal Mobile Telecommunications System
VOIP Voice Over Internet Protocol
VoLTE Voice Over LTE
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for managing communication links. In particular, communication links in telecommunications networks may be bridged when communication links fail. Communication links may fail for various reasons. For example, routing issues, interface issues, and the like may cause a failed communications link. When this happens, a user experience is negatively affected as a user is not able to regain full service until the communication link is restored. It may be desirable to create bridges such that communication links are maintained between a data source and the user (i.e., the user's session is not terminated).

A data source, as used herein, refers generally to a source with which a user may wish to be connected. An exemplary data source is the Internet. Additional data sources may be any sources that a user may wish to connect to that are in communication with one or more packet gateways (PGW's). A PGW, as used herein and known in the art, refers generally to a gateway that communicates packets of data from a user device to a destination.

In a telecommunications network, either a 3G telecommunications network or a 4G telecommunications network, the Internet is accessed via communication links that include, among other components, a PGW. When a communications link between the Internet and a PGW fails, a user is not able to access any content from the Internet. Further, if a different PGW is used to access the Internet, a user session may still be terminated as a new IP address is required. PGW's generally have ownership of specific IP address pools such that a PGW is only associated with specific IP addresses. The present invention seeks to maintain the connection when a communications link fails by utilizing a different PGW but maintaining the same IP address. Particular embodiments will be discussed below but in a brief example assume that a communications link between PGW1 and the Internet fails during a user session. As the session has already been initiated an IP address has already been assigned to the user session. If a new IP address is assigned to the user session then the existing user session will be terminated and a new user session initiated. This is not desirable as it will interrupt the user session and likely cause a negative user experience. As such, the present invention provides for the PGW to identify a neighboring PGW to take over the user session and also temporarily transfers the IP address associated with the user session to the neighboring PGW. This ensures the user session will continue without interruptions in service.

Figure 2:
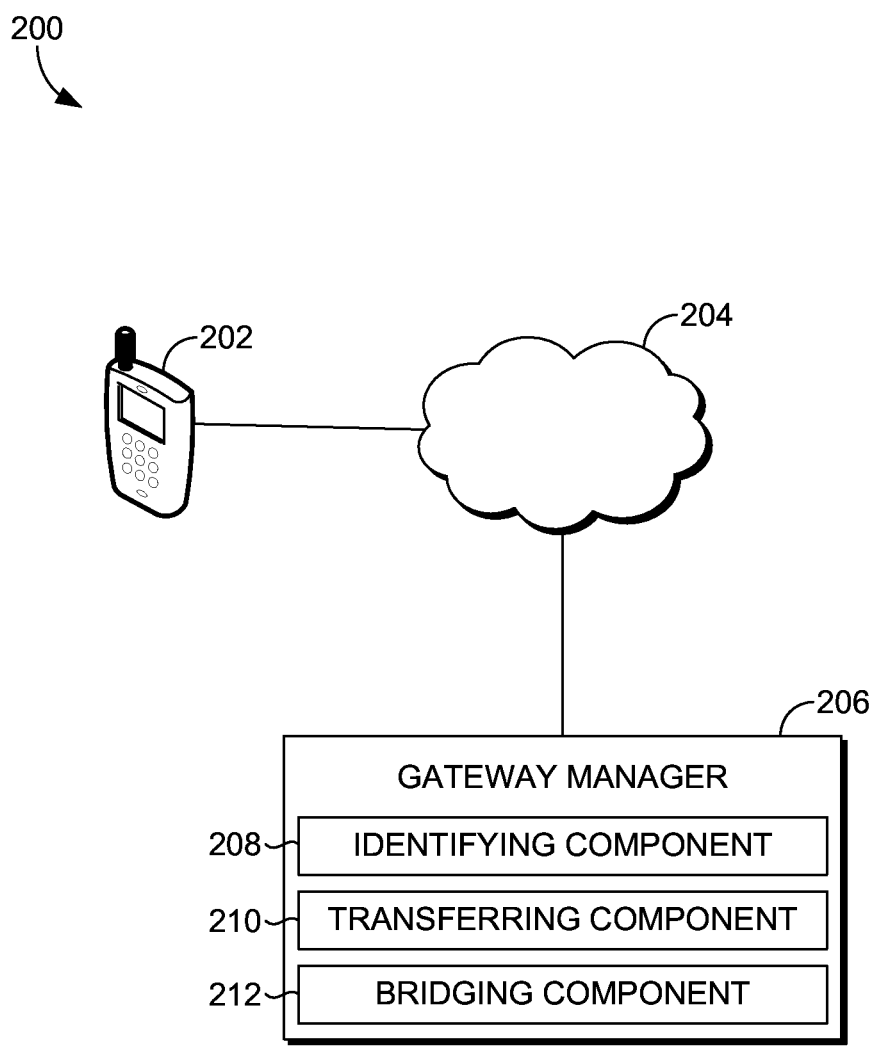
FIG. 2 depicts an illustrative operating system for carrying out embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment 200 be interpreted as having any dependency or requirement relating to any one or combination of components illustrated.

In the network environment 200, one or more user devices 202 may communicate with other devices, such as mobile devices, servers, etc. The user device 202 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 202 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 202 can utilize network 204 to communicate with other computing devices (e.g., a mobile device(s), a server(s), a personal computer(s), etc.). In embodiments, network 204 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 204 can include multiple networks, as well as being a network of networks, but is shown in more simple form so as to not obscure other aspects of the present invention. Network 204 can be part of a telecommunications network that connects subscribers to their immediate service provider. In embodiments, network 204 can be associated with a telecommunications provider that provides services to user devices, such as user device 202. For example, the network 204 may provide voice services to user devices or corresponding users that are registered or subscribed to utilize the services (e.g., the network 204) provided by a telecommunications provider. The network 204 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

The network environment 200 may include a database (not shown). The database may be similar to the memory component 112 of FIG. 1 and can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

The network environment 200 also includes a gateway manager 206. The gateway manager 206 is configured to bridge communications in a telecommunications network. The gateway manager 206 may be a stand-alone component or may be integrated into any component of the network 204 such as, for example, a HSGW, a PGW, a serving gateway (S-GW), and the like. Additionally, multiple components of network 204 may be associated with the gateway manager 206 or may include their own gateway manager 206.

The gateway manager 206 includes an identifying component 208, a transferring component 210, and a bridging component 212. The identifying component 208 is configured for, among other things, identifying a connection status or a failed communications link. A communications link, as used herein, refers generally to an indication that connectivity has been lost. The identifying component 208 may continuously monitor connectivity of a telecommunications system (and all components thereof) or may be manually triggered to check connectivity of a system. The identifying component 208 may identify a failed communications link based on criteria desired by an administrator. For example, a failed communications link may be identified by an increase in the loss of data communicated between two components (or more), an increase in unsuccessful data transfers, an identification of a single unsuccessful data transfer, or the like. In an embodiment, the identifying component 208 is configured to identify an unsuccessful data transfer between an HSGW and a PGW (i.e., the s2a interface). In an additional embodiment, the identifying component 208 is configured to identify an unsuccessful data transfer between a PGW and the Internet (i.e., the SGi interface).

The transferring component 210 is configured for, among other things, transferring traffic during a failed communications link. In particular, traffic that would otherwise be routed through the failed communications link is rerouted to another path. Additionally, data that was to be transferred via the failed communications link is rerouted to another path. The other path may be a "bridge" between the components of the failed communications link. For instance, a first gateway (e.g., a HSGW) and a second gateway (e.g., a PGW) may suffer a failed communications link. A "bridge" may be established to facilitate a replacement link until the failed communications link is restored. This bridge may be established by, for example, the bridging component 212 of FIG. 2. In a particular example, a PGW-Internet connection may fail such that a first gateway (e.g., PGW) may require a replacement gateway until the failed communications link is restored. This replacement gateway may serve as a bridge between the PGW and the Internet.

When the failed communications link is between a PGW and the Internet, a replacement PGW may be identified from a pool of PGW's. The replacement PGW may be identified by querying neighboring PGW's to identify PGW's having a connection with the Internet. Alternatively, neighboring PGW's may be queried to identify PGW's capable of establishing a connection with the Internet. Once the replacement PGW is identified, the failed PGW communicates that it will need to use the replacement PGW to access the Internet for its IP address pool. This may include all IP addresses in the IP address pool associated with the failed PGW or may only include affected IP addresses. The replacement PGW communicates to one or more edge routers in the telecommunications system that the IP address pool associated with PGW will be going to/from the replacement PGW instead. The IP address traffic then goes from the PGW to the replacement PGW to the Internet until either the communications link is restored between PGW and the Internet or until the session expires.

Once the communications link is restored, the failed PGW may notify the replacement PGW. The borrowed IP addresses may be returned to the failed PGW immediately or upon becoming inactive such that the replacement PGW relinquishes the temporary ownership of the borrowed IP addresses. The failed PGW will then notify the one or more edge routers that it has regained ownership of its IP address pool that was temporarily transferred to the replacement PGW.

If a session expires while the replacement PGW has temporary ownership of the IP address associated with the session, the IP address is not placed into an available pool. Rather, it is set aside to be returned to the failed PGW once the communications link is restored. This ensures that the IP address is ready to be returned when the failed PGW is able to accept it.

Several advantages exist for bridging communication links in this way. Customer experiences are improved as the user experiences a lower amount of down time in link failure scenarios, the network is more robust in case of outages, the user is unaware of the newly created bridge so the user experience is not likely negatively impacted, and the like. Additionally, telecommunications networks appear to be moving toward Self Organizing Networks (SONs) so automatic creation of bridges is closer to the self-healing aspect of SONs.

Figure 3:
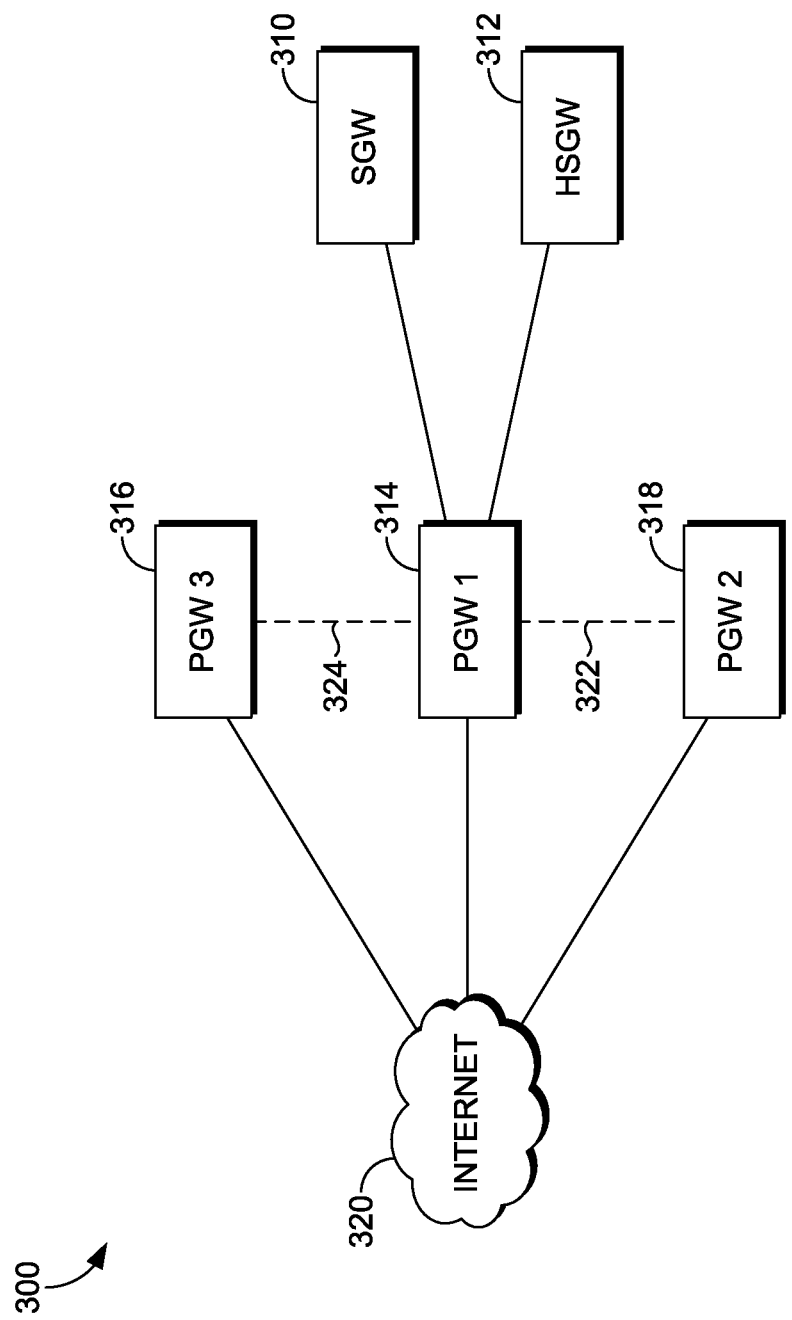
FIG. 3 depicts an illustrative operating system for carrying out embodiments of the present invention.

FIG. 3 provides a specific telecommunications environment 300 in which the present invention may be applied. In application, the telecommunications environment 300 may be a 4G telecommunications network or a 3G telecommunications network. This is indicated by the presence of both a serving gateway 310 (S-GW) (present in a 4G network) and a high speed gateway 312 (HSGW) (present in a 3G network). Both gateways are connected to a PGW. In this instance, the initial gateway (either the HSGW 312 or the SGW 310) is connected to PGW1 314. PGW1 314 has a connection with the Internet 320, as does PGW2 318 and PGW3 316. There may be more PGW's in the telecommunications environment 300 but are not shown as to not obscure the invention. Data is typically transferred from a PGW, such as any one of PGW1 314, PGW2 318, or PGW3 316, to the Internet 320.

In a specific embodiment, the connection between PGW1 314 and the Internet 320 fails. Thus, a replacement PGW is desired to bridge the path between PGW1 314 and the Internet 320. The PGW1 314 of the failed communications link may identify a neighboring PGW that is already connected to the Internet 320 or a neighboring PGW that is capable of establishing a connection to the Internet 320. As illustrated in FIG. 3, a neighboring PGW may be identified as PGW2 318 or PGW3 316. A bridge 322 is established between the PGW1 314 of the failed communications link and the replacement PGW2 318. A bridge 324 is also established between the PGW1 314 and the replacement PGW3 316. An IP address is associated with each session bound to the PGW1 314. Thus, if a different PGW were used, a new IP address is typically assigned to the incoming session and a user's existing session is terminated. In that case, a user would be aware that their session was terminated and down time would increase. Thus, once the replacement PGW is identified, temporary ownership of the IP address pool associated with PGW1 314 is temporarily transferred to the replacement PGW.

Once the communications link between PGW1 314 and the Internet 320 is reestablished, the bridge 322 or bridge 324 may no longer be used. Thus, PGW1 314 may immediately begin communicating with the Internet 320 again such that replacement PGW is not used as an intermediate any longer. Alternatively, replacement PGW may continue to be used for the remainder of sessions that were already transferred to it so that they are not transferred back to PGW1 314 during the session but, rather, will be transferred back to PGW1 314 once the session is terminated.

Figure 4:
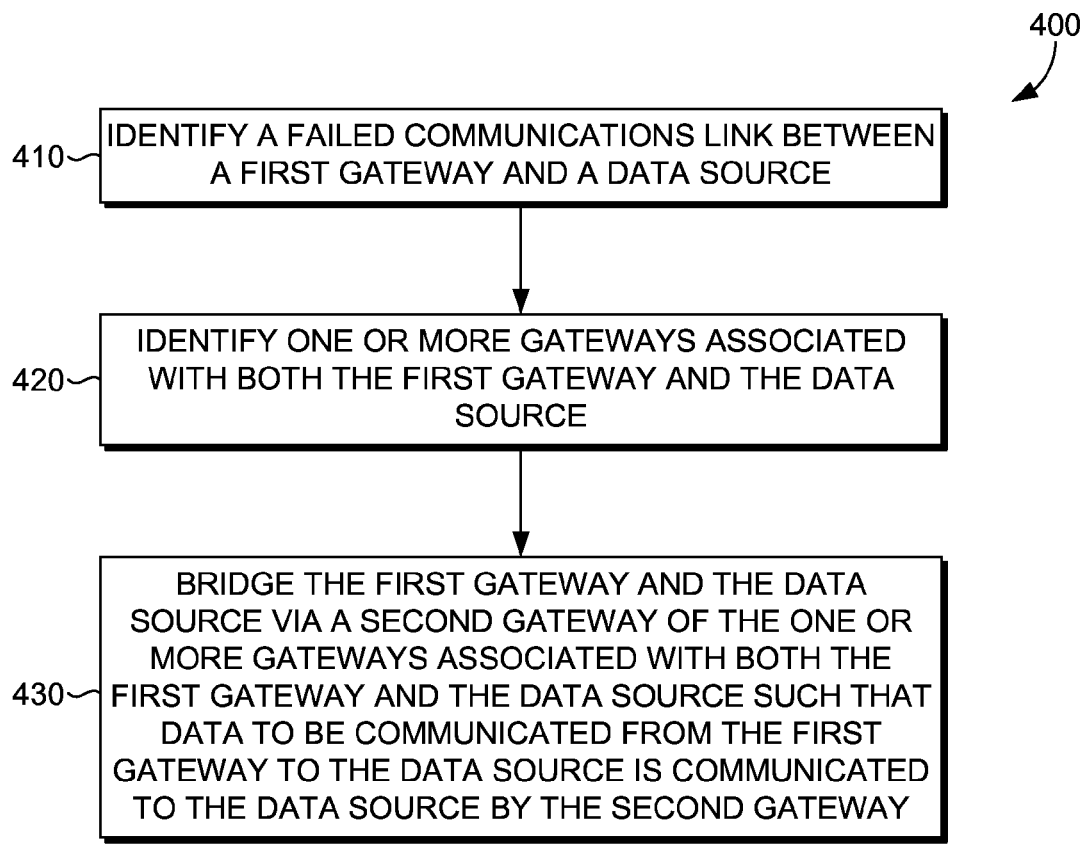
FIG. 4 provides a first exemplary method for managing communication links, in accordance with an embodiment of the present invention.

Turning now to FIG. 4, a flow diagram is shown illustrating a first exemplary method 400 for managing communication links in accordance with an embodiment of the present invention. Initially, at block 410, a failed communications link between a first gateway and a data source is identified. At block 420 one or more gateways associated with both the first gateway and the data source is identified. At block 430 the first gateway and the data source are bridged via a second gateway of the one or more gateways associated with both the first gateway and the data source such that data to be communicated from the first gateway to the data source is communicated to the data source by the second gateway.

It will be understood by those of ordinary skill in the art that the order of steps shown in the methods 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for managing communications links in a telecommunications network, the method comprising:
   identifying a failed communications link between a first gateway and a data source;
   at the first gateway associated with the failed communications link, identifying one or more gateways associated with the first gateway and the data source;
   bridging the first gateway and the data source via a second gateway of the one or more gateways associated with the first gateway and the data source such that data to be communicated from the first gateway to the data source is communicated to the data source by the second gateway;
   identifying one or more Internet Protocol (IP) addresses associated with the data to be communicated to the data source;
   transferring, temporarily, the one or more IP addresses associated with the data to be communicated to the data source to the second gateway; and
   when a session associated with at least one of the one or more IP addresses transferred to the second gateway is terminated, returning the at least one IP address to the first gateway for association with a new session to be bound to the first gateway.

2. The method of claim 1, wherein the first gateway is a packet gateway.

3. The method of claim 1, wherein the data source is the Internet.

4. The method of claim 1, wherein the telecommunications network is a third generation (3G) telecommunications network.

5. The method of claim 1, wherein the telecommunications network is a fourth generation (4G) telecommunications network.

6. A system for managing communications links in a telecommunications network, the system comprising:
   a computing device associated with one or more processors and one or more computer storage media; and
   at a first gateway:
   a gateway manager for managing communications links, wherein the gateway manager comprises:
   an identifying component for identifying a connectivity status between the first gateway and a data source and for identifying a second gateway associated with the first gateway and the data source,
   a bridging component for bridging communications between the first gateway to the data source via the second gateway associated with the first gateway and the data source, wherein the data source is the Internet, and
   a transferring component to temporarily transfer one or more IP addresses to the second gateway acting as a bridging gateway, wherein the one or more IP addresses are returned to the first gateway upon determining the first gateway has reestablished a communications link to the data source, and wherein the one or more IP addresses returned to the first gateway include at least one IP address associated with a session terminated at the second gateway during a temporary transfer.

7. The system of claim 6, wherein the telecommunications network is a third generation (3G) telecommunications network.

8. The system of claim 6, wherein the telecommunications network is a fourth generation (4G) telecommunications network.

9. The system of claim 6, wherein the first gateway is a packet gateway.

10. One or more non-transitory computer-readable storage media having computer-executable instructions embodied thereon that, when executed, perform a method for managing communications links, the method comprising:
- identifying a failed communications link between a first gateway and a data source, wherein the failed communications link indicates a loss of connectivity between the first gateway and the data source such that data is not communicated between the first gateway and the data source;
- at the first gateway associated with the failed communications link, identifying one or more gateways associated with the first gateway and the data source;
- bridging the first gateway and the data source via a second gateway of the one or more gateways associated with the first gateway and the data source such that data to be communicated from the first gateway to the data source is communicated to the data source by the second gateway;
- identifying one or more Internet Protocol (IP) addresses associated with the data to be communicated to the data source; and
- transferring, temporarily, the one or more IP addresses associated with the data to be communicated to the data source to the second gateway; and
- when a session associated with at least one of the one or more IP addresses temporarily transferred to the second gateway is terminated, returning the at least one IP address to the first gateway for association with a new session to be bound to the first gateway.

11. The method of claim 10, wherein the first gateway is a packet gateway.

12. The method of claim 10, wherein the data source is the Internet.

13. The method of claim 10, wherein the telecommunications network is a third generation (3G) telecommunications network.

14. The method of claim 10, wherein the telecommunications network is a fourth generation (4G) telecommunications network.

* * * * *